(12) United States Patent
Havanur

(10) Patent No.: US 7,876,584 B2
(45) Date of Patent: Jan. 25, 2011

(54) CIRCUIT AND METHOD FOR CONTROLLING THE SECONDARY FET OF TRANSFORMER COUPLED SYNCHRONOUS RECTIFIED FLYBACK CONVERTER

(75) Inventor: Sanjay Havanur, Cupertino, CA (US)

(73) Assignee: Alpha and Omega Semiconductor Incorporated, Sunnyvale, CA (US)

( * ) Notice: Subject to any disclaimer, the term of this patent is extended or adjusted under 35 U.S.C. 154(b) by 106 days.

(21) Appl. No.: 12/490,597

(22) Filed: Jun. 24, 2009

(65) Prior Publication Data

US 2010/0327947 A1 Dec. 30, 2010

(51) Int. Cl.
*H02M 3/335* (2006.01)

(52) U.S. Cl. .................. 363/21.14; 363/21.13

(58) Field of Classification Search .......... 363/21.04, 363/21.05, 21.06, 21.09, 21.12, 21.13, 21.14, 363/21.17, 78, 95, 97, 132
See application file for complete search history.

(56) References Cited

U.S. PATENT DOCUMENTS

| | | | |
|---|---|---|---|
| 5,331,533 A * | 7/1994 | Smith | 363/20 |
| 6,353,544 B1 * | 3/2002 | Lau | 363/21.14 |
| 6,778,417 B2 * | 8/2004 | Itakura et al. | 363/97 |
| 2001/0026462 A1 * | 10/2001 | Tokunaga et al. | 363/97 |
| 2003/0090914 A1 * | 5/2003 | Jansen et al. | 363/21.12 |
| 2006/0013022 A1 * | 1/2006 | Jitaru | 363/21.12 |

\* cited by examiner

*Primary Examiner*—Adolf Berhane
*Assistant Examiner*—Jeffrey Gblende
(74) *Attorney, Agent, or Firm*—Chein-Hwa Tsao; C H Emily LLC

(57) ABSTRACT

A secondary $FET_{sc}$ control circuit is disclosed for controlling $FET_{sc}$ of transformer coupled synchronous rectified flyback converter (TCSC). The control circuit includes source-drain voltage $V_{SD}$ sense trigger with output $V_{SD}$-trigger activated upon positive 0-crossing of $V_{SD}$. Drain-source current $I_{DS}$ sense trigger with output $I_{DS}$-trigger activated upon positive 0-crossing of $I_{DS}$. Secondary coil voltage Vsec sense trigger with output Vsec-trigger activated upon sensing negative Vsec. A multi-trigger gate driver (MTGD) has trigger inputs coupled to $V_{SD}$-trigger, $I_{DS}$-trigger, Vsec-trigger and drive output driving the $FET_{sc}$ gate. The MTGD has logic states of state-I where $FET_{sc}$ is turned off and latched, state-II where $FET_{sc}$ is turned off but unlatched, state-III where $FET_{sc}$ is turned on but unlatched. The MTGD is configured to enter state-III upon $V_{SD}$-trigger, enter state-I upon $I_{DS}$-trigger and enter state-IT upon Vsec-trigger. The control circuit thus avoids false triggering of the $FET_{sc}$ by numerous undesirable Vsec ringings.

13 Claims, 8 Drawing Sheets

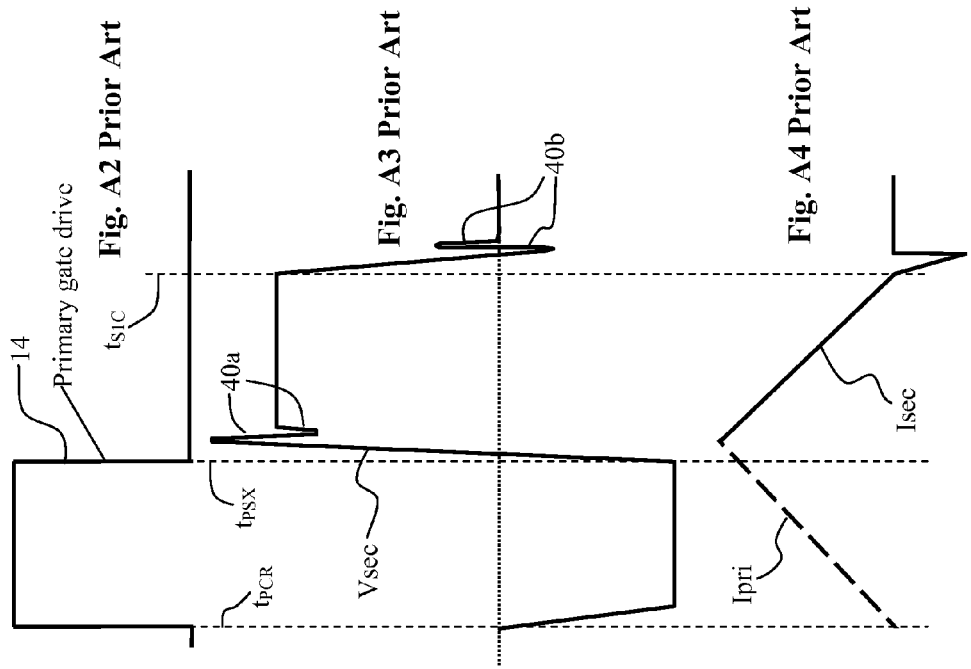
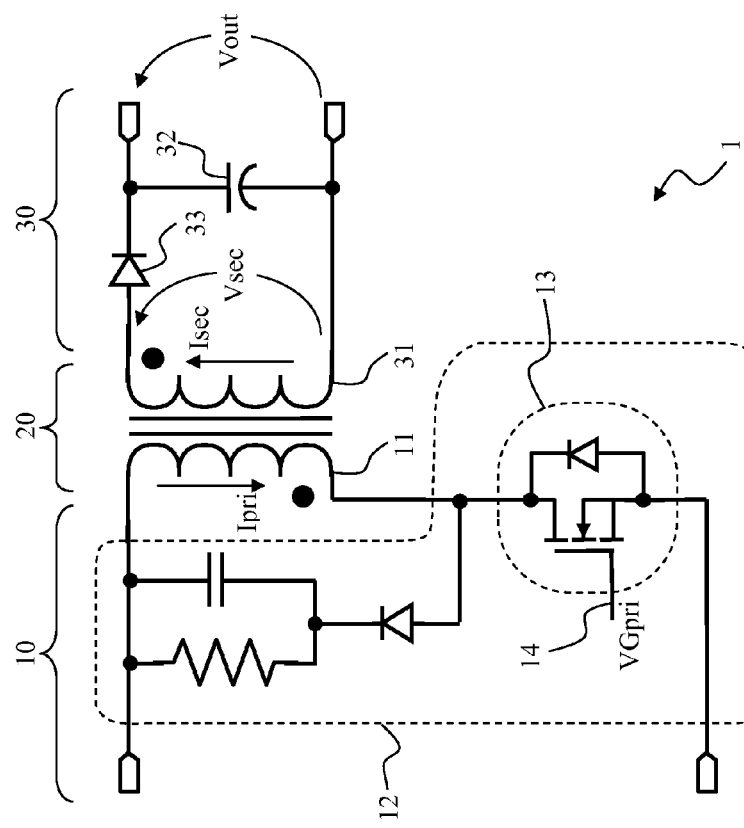

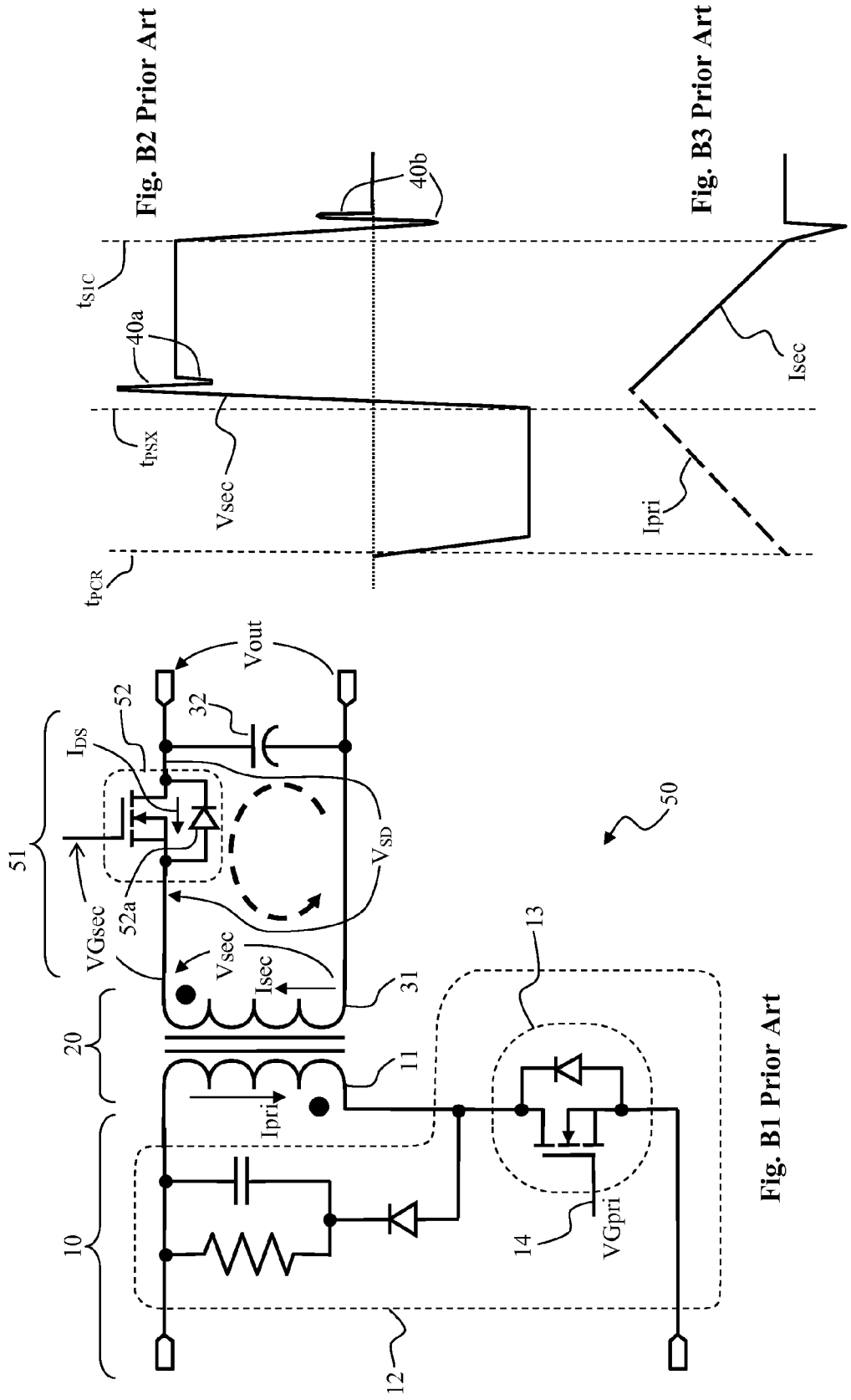

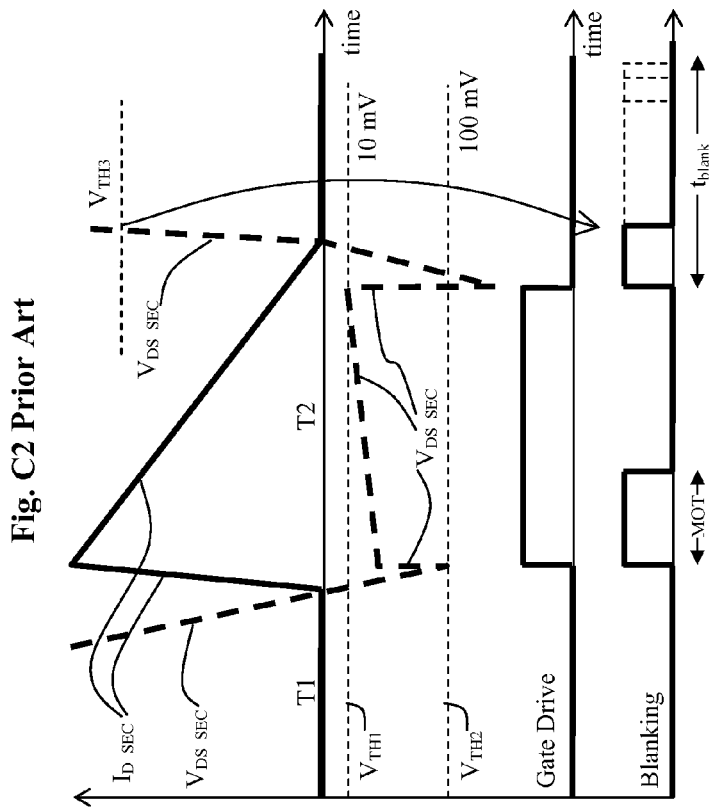
Fig. C2 Prior Art
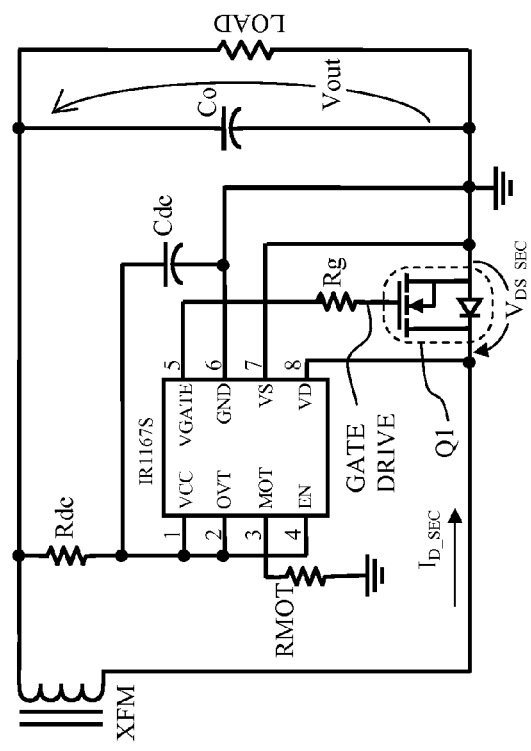
Fig. C1 Prior Art

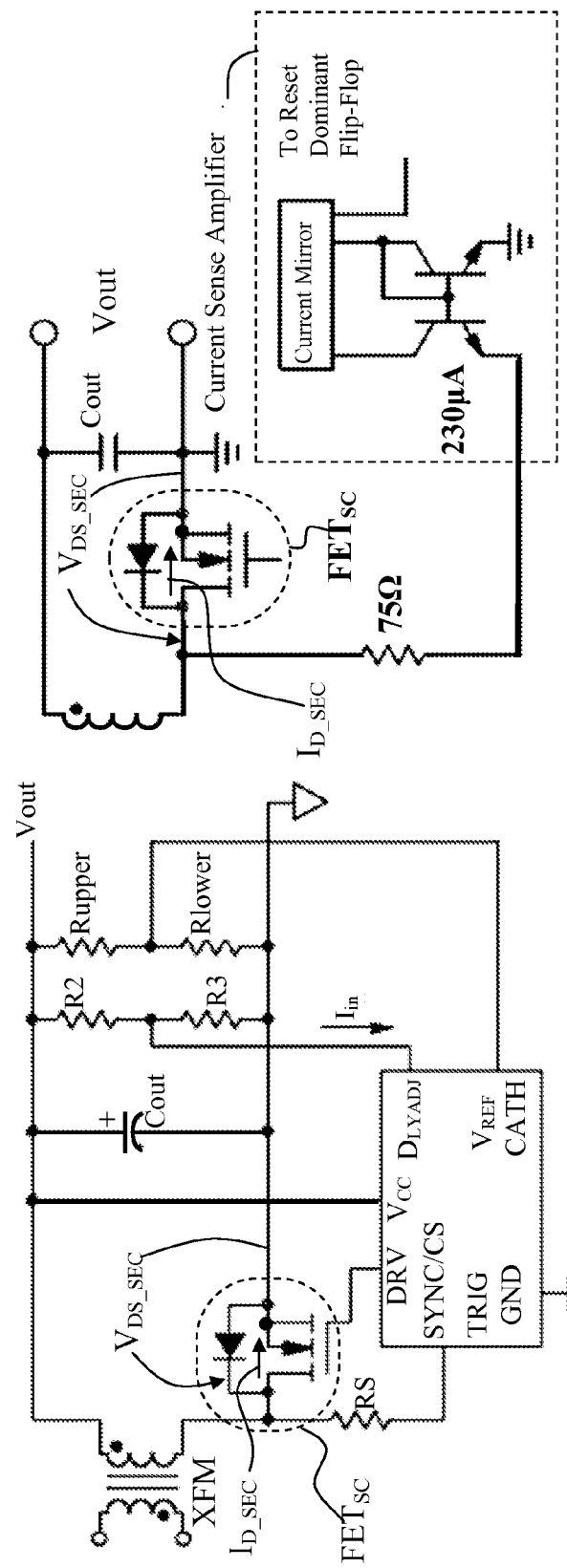
Fig. D2 Prior Art
Fig. D1 Prior Art

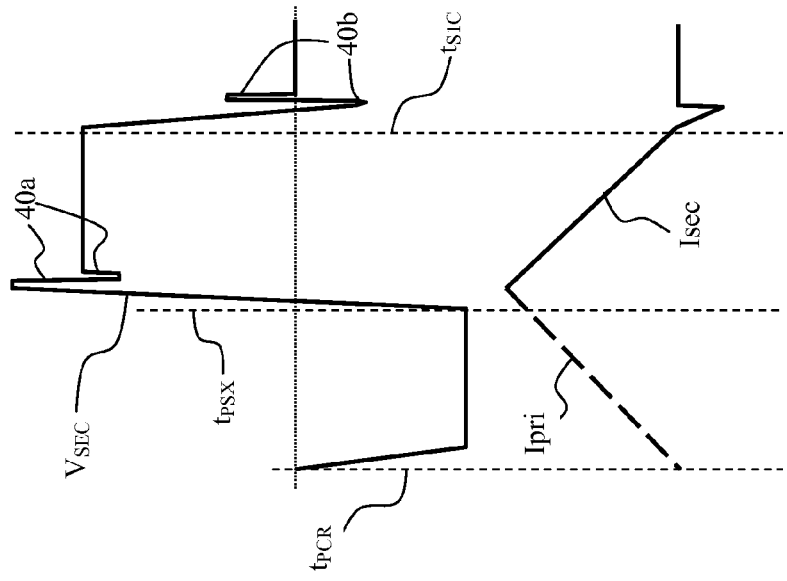
Fig. 1B Present Invention
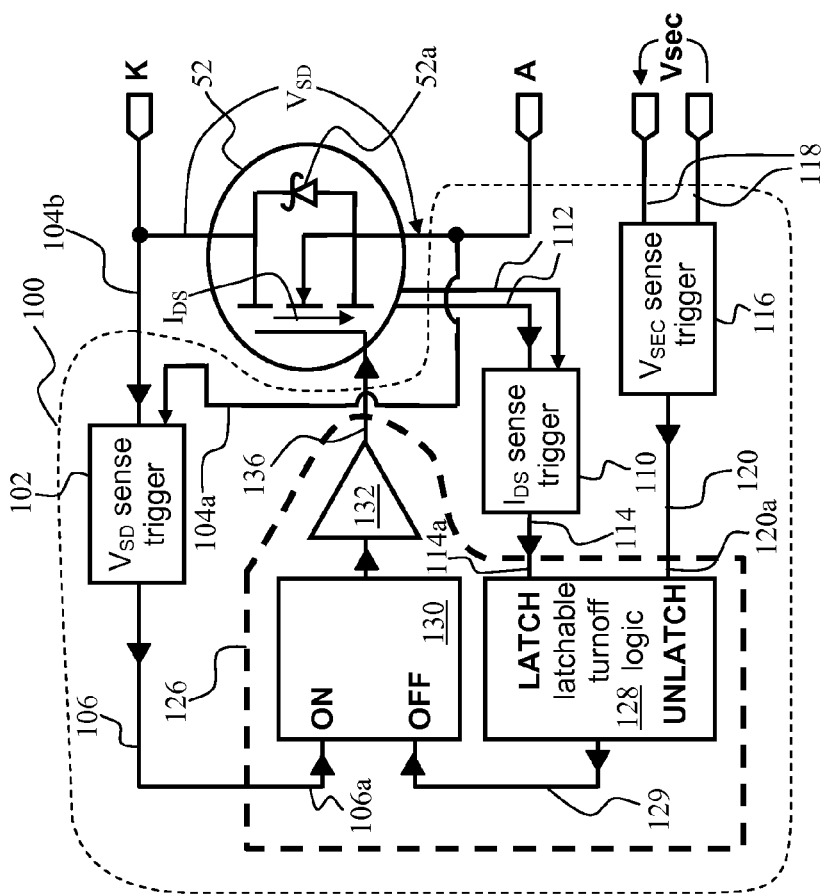
Fig. 1A Present Invention

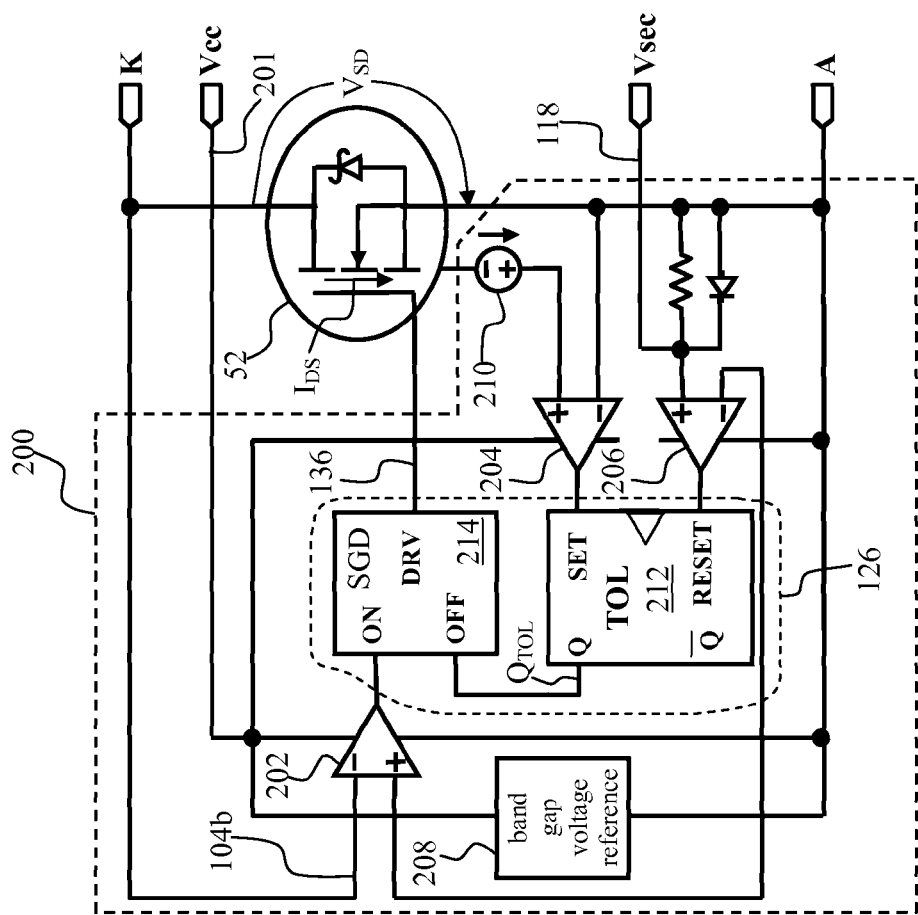
Fig. 2 Present Invention

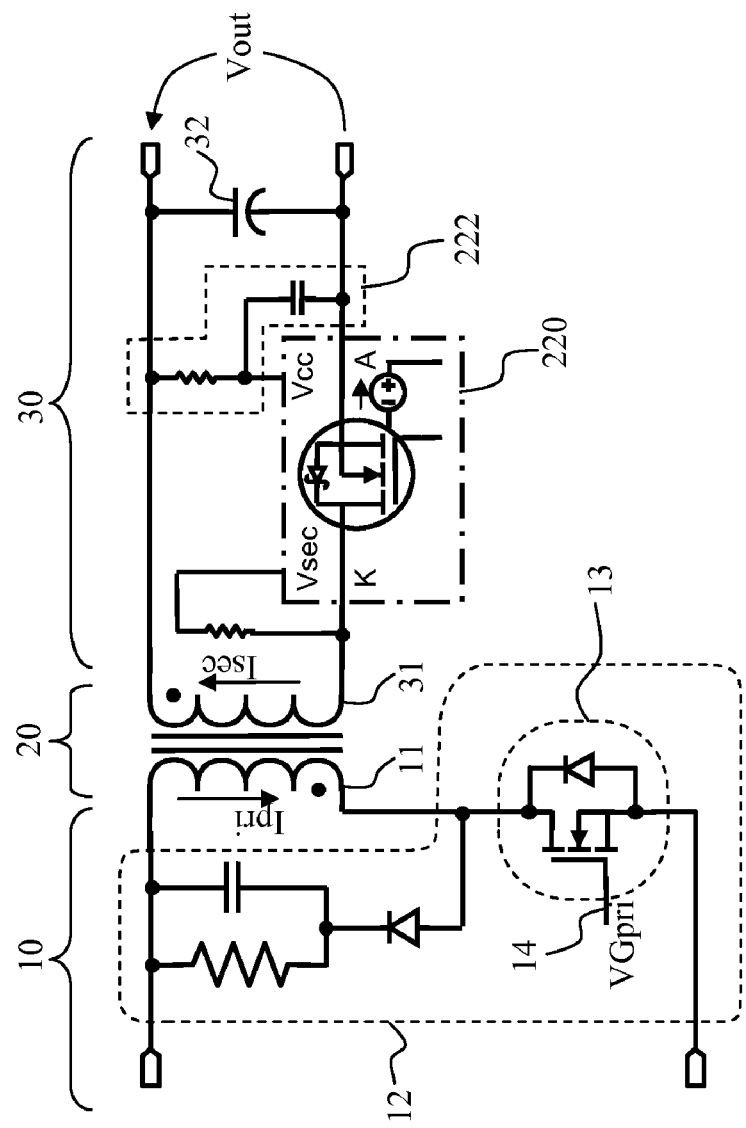
Fig. 3A Present Invention

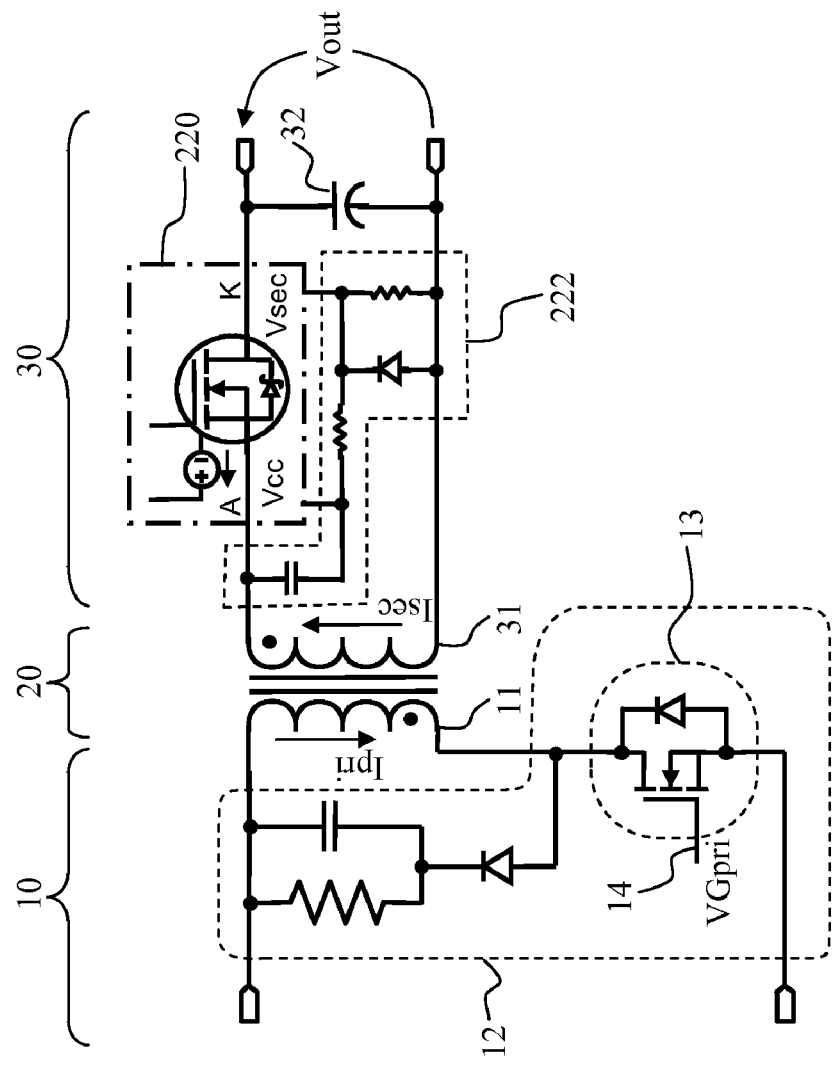
Fig. 3B Present Invention

US 7,876,584 B2

CIRCUIT AND METHOD FOR CONTROLLING THE SECONDARY FET OF TRANSFORMER COUPLED SYNCHRONOUS RECTIFIED FLYBACK CONVERTER

CROSS REFERENCE TO RELATED APPLICATIONS

1. Field of Invention

This invention relates generally to the field of power electronics. More specifically, the present invention is directed to precise control of a switching metal oxide semiconductor field effect transistor (MOSFET) on the secondary side of a flyback converter.

2. Background of the Invention

The usage of switched power converters has become ubiquitous in the electronics industry. A few examples are switching power supplies, DC-DC voltage converters and DC-AC voltage converters.

FIG. A1 through FIG. A4 illustrate a prior art transformer coupled conventional rectified flyback converter (TCCC) 1 with a primary circuit 10 and a secondary circuit 30 magnetically coupled through a coupling transformer 20 having a primary transformer coil (PTC) 11 and a secondary transformer coil (STC) 31. The primary circuit 10 has a primary switching network (PSN) 12 with internal cyclic active switching by a primary switching FET ($FET_{pm}$) 13 in turn controlled by a primary gate drive signal VGpri. As a result, a primary coil current Ipri and a secondary coil current Isec respectively flows in the primary transformer coil (PTC) 11 and the secondary transformer coil (STC) 31 effecting a magnetic power transfer from the primary circuit 10 to the secondary circuit 30. correspondingly, an alternating current (AC) secondary coil voltage Vsec is developed across the secondary transformer coil (STC) 31. The secondary circuit 30 has a network of power diode 33 and an output capacitor (Cout) 32 for rectifying and filtering Vsec into a desired output voltage Vout. During operation, each switching cycle of the primary gate drive signal VGpri 14, the developed secondary coil voltage Vsec and associated primary coil current Ipri plus secondary coil current Isec are respectively illustrated in FIG. A2, FIG. A3 and FIG. A4. Each switching cycle is characterized by a sequence of time marks $t_{PCR}$, $t_{PSX}$ and $t_{SIC}$. At time mark $t_{PCR}$ the signal VGpri 14 is turned on marking the start of primary coil current (Ipri) ramp up accompanied by a negative zero crossing (0-crossing) of the secondary coil voltage Vsec. At time mark $t_{PSX}$ the signal VGpri 14 is turned off marking the instant of a forceful Ipri-to-Isec transfer due to transformer action accompanied by a positive 0-crossing of Vsec with ringings 40a. Notice that, to simplify illustration the Ipri and the Isec current amplitudes are shown to be equal following a normalization using the coil turn ratios between the PTC 11 and the STC 31. As an important remark, the Vsec ringings 40a are induced during the forceful Ipri-to-Isec transfer owing to the existence of numerous leakage and parasitic inductances inherent in the transformer coils and the overall TCCC 1 circuit. Finally, near time mark $t_{SIC}$ the tail end of Isec decay causes additional Vsec ringings 40b due to a sharp power diode 33 current turn-off (following an injected charge carrier-storage decay) in combination with the numerous leakage and parasitic inductances.

Observe that, due to its substantial forward voltage drop (about 0.7 Volt to 1 Volt) during high current conduction, the power diode 33 can cause substantial power loss from the TCCC 1 between time marks $t_{PSX}$ and $t_{SIC}$. For this reason, the power diode 33 can be replaced with a secondary switching FET ($FET_{sc}$) 52 in the secondary circuit 51 of a transformer coupled synchronous rectified flyback converter (TCSC) 50 illustrated together with its operating signal waveforms in FIG. B1 through FIG. B3. To those skilled in the art, the $FET_{sc}$ 52 comes with an inherent parasitic body diode $BD_{sc}$ 52a. The secondary gate drive and device current of the $FET_{sc}$ 52 are labeled as VGsec and $I_{DS}$. The source-drain voltage of the $FET_{sc}$ 52, the same as the forward voltage of the power diode 33, is labeled as $V_{SD}$. Thus, as soon as the $BD_{sc}$ 52a gets forward biased near the time mark $t_{PSX}$ the $FET_{sc}$ 52 should be turned on hard via VGsec, shunting the $BD_{sc}$ 52a, causing a substantially lower forward voltage drop $V_{SD}$ (about 0.1 to 0.2 Volt) hence vastly reducing the associated power loss from the TCSC 50. On the other hand, near time mark $t_{SIC}$ the $FET_{sc}$ 52 needs to be turned off and kept off via VGsec either upon an imminent Vsec fall or upon sensing a first quadrant current (a positive $I_{DS}$) through the $FET_{sc}$ 52 to avoid shorting the Cout 32 through STC 31. This is signified by a dashed counter clockwise arc arrow.

While the above-stated requirements for turning on and off $FET_{sc}$ 52 are understood, the actual reliable implementation of VGsec control can be quite challenging due to the noisy presence of Vsec ringings 40a and 40b in the vicinity of time marks $t_{PSX}$ and $t_{SIC}$. A prior art example solution by International Rectifier Company (El Segundo, Calif.) is their IR1167S controller illustrated in FIG. C1 and FIG. C2. Similar in circuit topology to the just described TCSC 50, the secondary circuit here is powered by a secondary coil of a transformer XFM with a coil current $I_{D\_SEC}$ flowing through a secondary switching FET Q1 with its gate controlled by VGATE output of the IRI 167S. The drain-to-source voltage of FET Q1 is labelled as $V_{DS\_SEC}$. A regulated DC output Vout is developed across an output filter capacitor Co with a LOAD. The IR1167S itself is powered by an RC network made up of Rdc and Cdc. Thus, for correct operation the Gate Drive of FET Q1 must be turned ON and OFF at time marks referenced to time periods T1 and T2 where $V_{DS\_SEC}$ respectively crosses two threshold voltages $V_{TH2}$ and $V_{TH1}$ where $V_{TH2}$=−100 mV and $V_{TH1}$=−10 mV. In the presence of the aforementioned $V_{DS\_SEC}$ ringings near these threshold crossings, such low magnitude threshold voltages ($V_{TH2}$ and $V_{TH1}$) have necessitated additional measures such as time windows MOT (minimum ON-time) and tblank (blanking period) to be implemented as part of the IR1167S design. In essence, any additional threshold crossings of $V_{DS\_SEC}$ within either time windows MOT or tblank are to be ignored to reduce the chance of falsely switching the Gate Drive in the presence of $V_{DS\_SEC}$ ringings. Regardless of such additional measures, the IR1167S further recommends tight physical layout rules for the application circuit to reduce false Gate Drive switching.

Another prior art example solution by ON Semiconductor (Phoenix, Ariz.) is their NCP4302 controller and driver for controlling Gate Drive of the secondary switching $FET_{SC}$ as illustrated in FIG. D1 and FIG. D2. The NCP4302 senses voltage drop $V_{DS\_SEC}$ across the $FET_{SC}$ with a turn on threshold of 0.5 Volt. For zero detection of the secondary current, the voltage drop developed across a 75 Ohm resistor by a 230 microAmp current source is used with a 30 mV offset. However, to reduce the chance of falsely switching Gate Drive in the presence of $V_{DS\_SEC}$ ringing noises, minimum turn-ON and turn-OFF time intervals, both settable by a DLYADJ pin voltage, are still needed.

There are other examples of prior art which use discrete components. Here, besides using both voltage and current sensing to turn ON and OFF the secondary switching $FET_{SC}$, an extra winding on the transformer is also required. Such solutions require a large number of extra components and are not very efficient in their performance.

Therefore, there remains a need to reliably switching the secondary switching $FET_{SC}$ of a transformer coupled synchronous rectified flyback converter with very few additional discrete components and without complex user adjustments.

SUMMARY OF THE INVENTION

A circuit is proposed for controlling the secondary FET of a transformer coupled synchronous rectified flyback converter (TCSC) having a primary circuit and a secondary circuit coupled with a transformer. The primary circuit has a primary transformer coil (PTC) coupled with a primary switching network (PSN) switched by its primary switching FET ($FET_{pm}$). The secondary circuit has a serial connection of a secondary transformer coil (STC) with a secondary coil voltage (Vsec), an output capacitor (Cout) and a secondary switching FET ($FET_{sc}$) having a built-in parasitic body diode $BD_{sc}$ with a forward voltage $V_{SD}$. Each TCSC switching cycle is characterized by time marks $t_{PCR}$, $t_{PSX}$ and $t_{SIC}$ where $t_{PCR}$ marks the start of primary coil current (Ipri) ramp up followed by a negative 0-crossing of Vsec, $t_{PSX}$ marks the instant of primary coil current (Ipri)-to-secondary coil current (Isec) transfer followed by a positive 0-crossing of $V_{SD}$ with Vsec ringing and $t_{SIC}$ marks the start of $FET_{sc}$ first-quadrant conduction followed by a positive 0-crossing of $I_{DS}$ also with Vsec ringing. The secondary FET control circuit includes:

a) A $V_{SD}$ sense trigger with a trigger output $V_{SD}$-trigger and its analog inputs coupled to the $FET_{sc}$ terminals for sensing the $V_{SD}$ and, upon sensing a positive 0-crossing of $V_{SD}$, for activating the $V_{SD}$-trigger.

b) An $I_{DS}$ sense trigger with a trigger output $I_{DS}$-trigger and its analog inputs coupled to the $FET_{sc}$ terminals for sensing a drain-to-source current $I_{DS}$ of the $FET_{sc}$ and, upon sensing a positive 0-crossing of $I_{DS}$, for activating the $I_{DS}$-trigger.

c) A Vsec sense trigger with a trigger output Vsec-trigger and its analog inputs coupled to the STC terminals for sensing the Vsec and, upon sensing a negative Vsec, for activating the Vsec-trigger.

d) A multi-trigger gate driver (MTGD) having trigger inputs $V_{SD}$-input, $I_{DS}$-input and Vsec-input respectively coupled to the $V_{SD}$-trigger, $I_{DS}$-trigger and Vsec-trigger, a drive output $V_{GATE}$ coupled to the gate of $FET_{sc}$ and a set of logic states of:

State-I where the $FET_{sc}$ is turned off and latched thus it can not be triggered on.

State-II where the $FET_{sc}$ is turned off but unlatched thus it can be triggered on.

State-III where the $FET_{sc}$ is turned on but unlatched thus it can be triggered off.

The MTGD is configured to enter state-III upon activation of the $V_{SD}$-trigger, enter state-I upon activation of the $I_{DS}$-trigger and enter state-II upon activation of the Vsec-trigger.

As a result, the secondary FET control circuit avoids false triggering of the $FET_{sc}$ by the numerous undesirable Vsec ringings and entry into incorrect states around the time marks $t_{PSX}$ and $t_{SLC}$ resulting in an otherwise increased secondary power loss of the TCSC.

As a more specific embodiment, the secondary FET control circuit includes a bias voltage input terminal (BVIT) for receiving a low power bias voltage Vcc powering the $V_{SD}$ sense trigger, the $I_{DS}$ sense trigger, the Vsec sense trigger and the MTGD. The Vcc can be generated by a low-power bias network (LPBN) in parallel connection with the STC. Alternatively, the Vcc can also be generated by a low-power bias network (LPBN) in parallel connection with the Cout.

In a more specific embodiment, the MTGD includes:

A switchable gate driver (SGD) having a digital trigger input ON coupled to the $V_{SD}$-trigger, a digital trigger input OFF and a drive output $V_{GATE}$ coupled to the gate of $FET_{sc}$ so as to turn on $FET_{sc}$ upon activation of the digital trigger input ON whereas turn off $FET_{sc}$ upon activation of the digital trigger input OFF.

A turn off and latch (TOL) having a digital trigger input SET coupled to the $I_{DS}$-trigger, a digital trigger input RESET coupled to the Vsec-trigger and a digital output $Q_{TOL}$ coupled to the digital trigger input OFF such that activation of the digital trigger input SET activates the $Q_{TOL}$ whereas activation of the digital trigger input RESET deactivates the $Q_{TOL}$.

In a more specific embodiment, the analog inputs of the $I_{DS}$ sense trigger are integrated into the $FET_{sc}$ with a four-terminal current sensing Kelvin connection producing a sampled $I_{DS}$ sense current that is a small fraction of the $I_{DS}$.

In a more specific embodiment, the $V_{SD}$ sense trigger, the Vsec sense trigger and the MTGD are co-packaged with the $FET_{sc}$ so as to form a 4-terminal replacement device for the $FET_{sc}$ with further increased noise immunity against false triggering of the $FET_{sc}$. The 4-terminal replacement device can be deployed to locate at either the high-side or the low-side of the STC.

A method is proposed for controlling the secondary FETsc of the transformer coupled synchronous rectified flyback converter (TCSC). The method includes:

a) Sensing the forward voltage VSD across the body diode BDsc, a drain-to-source current $I_{DS}$ of the FETsc and the Vsec.

b1) Upon sensing a positive 0-crossing of VSD, turning on the FETsc and maintaining it in a conductive but unlatched state so it may subsequently be turned off.

b2) Upon sensing a positive 0-crossing of IDS, turning off the FETsc and maintaining it in a latched state so it may not be subsequently turned on.

b3) Upon sensing a negative Vsec, turning off the latch of FETsc and maintaining it in an unlatched state so it may subsequently be turned on.

As a result, the method avoids false triggering of the $FET_{sc}$ by the numerous undesirable Vsec ringings and entry into incorrect states around the time marks $t_{PSX}$ and $t_{SIC}$ resulting in an otherwise increased secondary power loss of the TCSC.

As a refinement, sensing the drain-to-source current $I_{DS}$ can be done by integrating a four-terminal current sensing Kelvin connection into the FETsc for producing a sampled IDS sense current that is a small fraction of the IDS.

These aspects of the present invention and their numerous embodiments are further made apparent, in the remainder of the present description, to those of ordinary skill in the art.

BRIEF DESCRIPTION OF THE DRAWINGS

In order to more fully describe numerous embodiments of the present invention, reference is made to the accompanying drawings. However, these drawings are not to be considered limitations in the scope of the invention, but are merely illustrative.

FIG. A1 through FIG. A4 illustrate a prior art transformer coupled conventional rectified flyback converter;

FIG. B1 through FIG. B3 illustrate another prior art transformer coupled synchronous rectified flyback converter;

FIG. C1 and FIG. C2 illustrate a prior art control circuit for controlling the secondary switching FET in a transformer coupled synchronous rectified flyback converter;

FIG. D1 and FIG. D2 illustrate another prior art control circuit for controlling the secondary switching FET in a transformer coupled synchronous rectified flyback converter;

FIG. 1A and FIG. 1B illustrate the present invention control circuit for controlling the secondary switching FET in a transformer coupled synchronous rectified flyback converter;

FIG. 2 illustrates a more detailed circuit schematic of the present invention control circuit for controlling the secondary switching FET in a transformer coupled synchronous rectified flyback converter; and FIG. 3A and FIG. 3B illustrate two embodiments of the present invention control circuit as deployed in a transformer coupled synchronous rectified flyback converter.

DETAILED DESCRIPTION OF SPECIFIC EMBODIMENTS

The description above and below plus the drawings contained herein merely focus on one or more currently preferred embodiments of the present invention and also describe some exemplary optional features and/or alternative embodiments. The description and drawings are presented for the purpose of illustration and, as such, are not limitations of the present invention. Thus, those of ordinary skill in the art would readily recognize variations, modifications, and alternatives. Such variations, modifications and alternatives should be understood to be also within the scope of the present invention.

FIG. 1A and FIG. 1B illustrate the present invention $FET_{sc}$ control circuit 100 for controlling the secondary switching $FET_{sc}$ 52 in a TCSC (see FIG. B1). Recall that the secondary circuit 51 has a serial connection of a secondary transformer coil STC 31 with a secondary coil voltage Vsec, an output capacitor Cout 32 and the $FET_{sc}$ 52. The $FET_{sc}$ 52 has a built-in parasitic body diode $BD_{sc}$ 52a with a forward voltage $V_{SD}$. As shown again in FIG. 1B, each TCSC switching cycle is characterized by time marks $t_{PCR}$, $t_{PSX}$ and $t_{SIC}$ where $t_{PCR}$ marks the start of primary coil current (Ipri) ramp up followed by a negative 0-crossing of Vsec, $t_{PSX}$ marks the instant of primary coil current (Ipri)-to-secondary coil current (Isec) transfer followed by a positive 0-crossing of $V_{SD}$ with Vsec ringing and $t_{SIC}$ marks the start of $FET_{sc}$ first-quadrant conduction followed by a positive 0-crossing of $I_{DS}$ also with Vsec ringing (notice the opposite polarity of Isec and $I_{DS}$). The $FET_{sc}$ control circuit 100 includes:

A $V_{SD}$ sense trigger 102 with a digital trigger output signal $V_{SD}$-trigger 106. The analog inputs 104a and 104b of the $V_{SD}$ sense trigger 102 are respectively coupled to the $FET_{sc}$ 52 source and drain terminals for sensing its $V_{SD}$. The $V_{SD}$ sense trigger 102 is designed to activate its trigger output signal $V_{SD}$-trigger 106 upon sensing a positive 0-crossing of $V_{SD}$.

An $I_{DS}$ sense trigger 110 with a digital trigger output signal $I_{DS}$-trigger 114. The analog inputs 112 of the $I_{DS}$ sense trigger 110 are coupled to the $FET_{sc}$ 52 terminals for sensing its drain-to-source current $I_{DS}$. The $I_{DS}$ sense trigger 110 is designed to activate its trigger output signal $I_{DS}$-trigger 114 upon sensing a positive 0-crossing of $I_{DS}$.

A Vsec sense trigger 116 with a digital trigger output signal Vsec-trigger 120. The analog inputs 118 of the Vsec sense trigger 116 are coupled to the STC 31 terminals for sensing the secondary coil voltage Vsec. The Vsec sense trigger 116 is designed to activate its trigger output signal Vsec-trigger 120 upon sensing a negative Vsec.

A serial connection of a gating circuit 130 and a buffer driver 132 for generating a drive output signal $V_{GATE}$ 136 to turn ON or OFF the $FET_{sc}$ 52. The gating circuit 130 can be turned ON via its $V_{SD}$-input 106a that is the trigger output signal $V_{SD}$-trigger 106 of the $V_{SD}$ sense trigger 102. The gating circuit 130 can be turned OFF via its OFF-signal 129.

A latchable turn-off logic 128 has an output that is the OFF-signal 129. The LATCH and UNLATCH input signals of the latchable turn-off logic 128, respectively labeled as $I_{DS}$-input 114a and Vsec-input 120a, function to turn OFF the gating circuit 130 via the OFF-signal 129 while respectively keeping the gating circuit 130 in an ON or OFF state. With the latchable turn-off logic 128 in its latched state, the gating circuit 130 can not be turned on by its $V_{SD}$-input 106a. With the latchable turn-off logic 128 in its unlatched state, the gating circuit 130 can be turned on by its $V_{SD}$-input 106a. The $I_{DS}$-input 114a and Vsec-input 120a of the latchable turn-off logic 128 are respectively hooked up to the trigger output signal $I_{DS}$-trigger 114 and the trigger output signal Vsec-trigger 120.

Thus, upon activation of the trigger output signal $I_{DS}$-trigger 114 the $FET_{sc}$ 52 is turned off. However, upon activation of the trigger output signal $V_{SD}$-trigger 106 the $FET_{sc}$ 52 can only be turned on if the $V_{SD}$-trigger 106 activation is preceded by a Vsec-trigger 120 activation. Rephrased within the context of controlling the $FET_{sc}$ 52 of the secondary circuit 51, the following statement can be made:

Upon sensing a positive 0-crossing of $I_{DS}$ or a negative Vsec the $FET_{sc}$ 52 is turned off. However, upon sensing a positive 0-crossing of $V_{SD}$ the $FET_{sc}$ 52 can only be turned on if this positive 0-crossing of $V_{SD}$ is preceded by a sensing of a negative Vsec.

Hence the present invention $FET_{sc}$ control circuit 100, rather than switching the $FET_{sc}$ 52 on and off simply according to the thresholded instantaneous Vsec and $I_{DS}$ signal levels, switches the $FET_{sc}$ 52 on and off according to the natural logical operating sequence of the TCSC 50 despite the presence of the Vsec ringings 40a and 40b. As a result, the $FET_{sc}$ control circuit 100 can substantially reduce the chance of false triggering of the $FET_{sc}$ 52 due to Vsec ringings 40a and 40b and entry into incorrect ON/OFF states around the time marks $t_{PSX}$ and $t_{SIC}$ that could otherwise increase secondary power loss of the TCSC 50.

To those skilled in the art, the interconnected latchable turn-off logic 128, gating circuit 130 and buffer driver 132 function as a multiple-trigger gate driver (MTGD) 126 as outlined in FIG. 1A. The MTGD 126 has a drive output signal $V_{GATE}$ 136 driving the gate of $FET_{sc}$ 52. The MTGD 126 has trigger inputs $V_{SD}$-input 106a, $I_{DS}$-input 114a and Vsec-input 120a respectively coupled to the $V_{SD}$ sense trigger 102, the $I_{DS}$ sense trigger 110 and the Vsec sense trigger 116. Additionally, the MTGD 126 has a set of logic states of:

State-I where the $FET_{sc}$ 52 is turned off and latched thus it can not be triggered on by the $V_{SD}$ sense trigger 102.

State-II where the $FET_{sc}$ 52 is turned off but unlatched thus it can be triggered on by the $V_{SD}$ sense trigger 102.

State-III where the $FET_{sc}$ 52 is turned on but unlatched thus it can be triggered off by the $I_{DS}$ sense trigger 110.

The MTGD 126 is further configured to enter state-III upon activation of the $V_{SD}$ sense trigger 102, enter state-I upon activation of the $I_{DS}$ sense trigger 110 and enter state-II upon activation of the Vsec sense trigger 116. It should also become clear that numerous other logic building blocks, other than the latchable turn-off logic 128 and the gating circuit 130 just described, can be designed and configured to perform a function equivalent to the MTGD 126. Terminal-A and terminal-K of the $FET_{sc}$ control circuit 100 are provided, as will be presently illustrated, to hook it up along the conduction path of the secondary coil current Iscc.

FIG. 2 illustrates a more detailed circuit schematic of the present invention $FET_{sc}$ control circuit 200 for controlling the $FET_{sc}$ 52 in a TCSC 50. The $V_{SD}$ sense trigger 102 of the previous $FET_{sc}$ control circuit 100 is embodied in a voltage comparator 202. The $I_{DS}$ sense trigger 110 of the previous $FET_{sc}$ control circuit 100 is embodied in a Kelvin connection $I_{DS}$ sensor 210 plus a voltage comparator 204. More specifically, the Kelvin connection employs a four-terminal current sensing configuration that is integrated into the $FET_{sc}$ 52 producing a sampled $I_{DS}$ sense current that is a small fraction of the $I_{DS}$. As a specific example of application, the ratio of $I_{DS}$ to $I_{DS}$ sense current can range from about 100:1 to about 100000:1. The Vsec sense trigger 116 of the previous $FET_{sc}$ control circuit 100 is embodied in a voltage comparator 206. Without showing unnecessary obscuring details, the threshold voltages for the various voltage comparators 202, 204 and 206 can be created by a band gap voltage reference 208. As additional examples of application, the threshold voltage for the voltage comparator 202 can be set from about 20 mV to about 200 mV. The threshold voltage for the voltage comparator 204 can be set to correspond to an $I_{DS}$ threshold of from about 0.1 mA to about 10 mA. The threshold voltage for the voltage comparator 206 can be set from about −0.1 V to about −1 V. The MTGD 126 is now embodied in a turn off and latch (TOL) 212 and a switchable gate driver (SGD) 214 with a digital output $Q_{TOL}$ of the TOL 212 coupled to a digital input OFF of the SGD 214. The digital output DRV of SGD 214 is connected to the drive output signal $V_{GATE}$ 136 driving the $FET_{sc}$ 52. The digital inputs SET and RESET of the TOL 212 are respectively coupled to the outputs of the voltage comparators 204 and 206 while the digital input ON of the SGD 214 is coupled to the output of the voltage comparator 202. Thus, activation of the digital inputs SET and RESET would respectively activate and deactivate the $Q_{TOL}$. In a similar manner, activation of the digital inputs ON and OFF would respectively turn the $FET_{sc}$ 52 ON and OFF. Finally, all the just described signal processing building blocks of the $FET_{sc}$ control circuit 200 are powered by a bias voltage input terminal (BVIT) 201 at voltage Vcc.

FIG. 3A and FIG. 3B illustrate two embodiments of the present invention control circuit as deployed in a TCSC. In FIG. 3A a present invention $FET_{sc}$ plus control circuit 220 is deployed with its Terminal-A and terminal-K hooked up along the low-side conduction path of the secondary coil current Isec. Hence the $FET_{sc}$ plus control circuit 220 forms a 4-terminal replacement device for the $FET_{sc}$ 52. A low-power bias network (LPBN) 222, in parallel connection with Cout 32, is provided to generate the Vcc. In FIG. 3B a present invention $FET_{sc}$ plus control circuit 220 is deployed with its Terminal-A and terminal-K hooked up along the high-side conduction path of the secondary coil current Isec. Hence the $FET_{sc}$ plus control circuit 220 also forms a 4-terminal replacement device for the $FET_{sc}$ 52. A low-power bias network (LPBN) 222, in parallel connection with the STC 31, is provided to generate the Vcc.

Throughout the description and drawings, numerous exemplary embodiments were given with reference to specific configurations. It will be appreciated by those of ordinary skill in the art that the present invention can be embodied in numerous other specific forms and those of ordinary skill in the art would be able to practice such other embodiments without undue experimentation. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

What is claimed are:

1. A circuit for controlling the secondary FET of a transformer coupled synchronous rectified flyback converter (TCSC) having a primary circuit and a secondary circuit with transformer coupling there between, the primary circuit having a primary transformer coil (PTC) coupled with a primary switching network (PSN) being switched by its built-in primary switching FET ($FET_{pm}$), the secondary circuit having a serial connection of a secondary transformer coil (STC) with a secondary coil voltage (Vsec) there across, an output capacitor (Cout) and a secondary switching FET ($FET_{sc}$) having a built-in parasitic body diode $BD_{sc}$ with a forward voltage $V_{SD}$ there across, each of the synchronous switching cycles of the TCSC is characterized by a sequence of time marks $t_{PCR}$, $t_{PSX}$ and $t_{SIC}$ wherein $t_{PCR}$ marks the start of primary coil current (Ipri) ramp up followed by a negative 0-crossing of Vsec, $t_{PSX}$ marks the instant of primary coil current (Ipri)-to-secondary coil current (Isec) transfer followed by a positive 0-crossing of $V_{SD}$ with Vsec ringing and $t_{SIC}$ marks the start of $FET_{sc}$ first-quadrant conduction followed by a positive 0-crossing of $I_{DS}$ also with Vsec ringing, the secondary FET control circuit comprises:

a) a $V_{SD}$ sense trigger with a digital trigger output signal $V_{SD}$-trigger and its analog inputs coupled to the $FET_{sc}$ terminals for sensing the $V_{SD}$ and, upon sensing a positive 0-crossing of $V_{SD}$, for activating said $V_{SD}$-trigger;

b) an $I_{DS}$ sense trigger with a digital trigger output signal $I_{DS}$-trigger and its analog inputs coupled to the $FET_{sc}$ terminals for sensing a drain-to-source current $I_{DS}$ of the $FET_{sc}$ and, upon sensing a positive 0-crossing of $I_{DS}$, for activating said $I_{DS}$-trigger;

c) a Vsec sense trigger with a digital trigger output signal Vsec-trigger and its analog inputs coupled to the STC terminals for sensing the Vsec and, upon sensing a negative Vsec, for activating said Vsec-trigger; and d) a multiple-trigger gate driver (MTGD) having digital trigger inputs $V_{SD}$-input, $I_{DS}$-input and Vsec-input respectively coupled to said $V_{SD}$-trigger, $I_{DS}$-trigger and Vsec-trigger, a drive output signal $V_{GATE}$ coupled to the gate of $FET_{sc}$ and a set of logic states of:

state-I where the $FET_{sc}$ is turned off and latched thus can not be triggered on;

state-II where the $FET_{sc}$ is turned off but unlatched thus can be triggered on; and state-III where the $FET_{sc}$ is turned on but unlatched thus can be triggered off; and said MTGD is configured to enter state-III upon activation of said $V_{SD}$-trigger, enter state-I upon activation of said $I_{DS}$-trigger and enter state-II upon activation of said Vsec-trigger whereby avoid false triggering of the $FETs_{sc}$ caused by the numerous undesirable Vsec ringings, into incorrect states around the time marks $t_{PSX}$ and $t_{SIC}$ that would otherwise result in an increased secondary power loss of the TCSC.

2. The secondary FET control circuit of claim 1 further comprises a bias voltage input terminal (BVIT) for receiving a low power bias voltage Vcc powering the $V_{SD}$ sense trigger, the $I_{DS}$ sense trigger, the Vsec sense trigger and the MTGD.

3. The secondary FET control circuit of claim 2 wherein the Vcc is generated by a low-power bias network (LPBN) in parallel connection with the STC.

4. The secondary FET control circuit of claim 2 wherein the Vcc is generated by a low-power bias network (LPBN) in parallel connection with the Cout.

5. The secondary FET control circuit of claim 1 wherein said MTGD further comprises:
  a switchable gate driver (SGD) having a digital trigger input ON coupled to said $V_{SD}$-trigger, a digital trigger input OFF and a drive output signal $V_{GATE}$ coupled to the gate of $FET_{sc}$ so as to turn on $FET_{sc}$ upon activation of the digital trigger input ON whereas turn off $FET_{sc}$ upon activation of the digital trigger input OFF; and
  a turn off and latch (TOL) having a digital trigger input SET coupled to said $I_{DS}$-trigger, a digital trigger input RESET coupled to said Vsec-trigger and a digital output $Q_{TOL}$ coupled to the digital trigger input OFF such that activation of the digital trigger input SET activates the $Q_{TOL}$ whereas activation of the digital trigger input RESET deactivates the $Q_{TOL}$.

6. The secondary FET control circuit of claim 1 wherein the analog inputs of said $I_{DS}$ sense trigger are integrated into the $FET_{sc}$ with a four-terminal current sensing Kelvin connection producing a sampled $I_{DS}$ sense current that is a small fraction of the $I_{DS}$.

7. The secondary FET control circuit of claim 6 where the $V_{SD}$ sense trigger, the Vsec sense trigger and the MTGD are co-packaged with the $FET_{sc}$ so as to form a 4-terminal replacement device for the $FET_{sc}$ with further increased noise immunity against false triggering of the $FET_{sc}$.

8. The secondary FET control circuit of claim 7 where the 4-terminal replacement device is located at the high-side of the STC.

9. The secondary FET control circuit of claim 7 where the 4-terminal replacement device is located at the low-side of the STC.

10. A method for controlling the secondary FET of a transformer coupled synchronous rectified flyback converter (TCSC) having a primary circuit and a secondary circuit with transformer coupling there between, the primary circuit having a primary transformer coil (PTC) coupled with a primary switching network (PSN) being switched by its built-in primary switching FET ($FET_{pm}$), the secondary circuit having a serial connection of a secondary transformer coil (STC) with a secondary coil voltage (Vsec) there across, an output capacitor (Cout) and a secondary switching FET ($FET_{sc}$) having a built-in parasitic body diode $BD_{sc}$ with a forward voltage $V_{SD}$ there across, each of the synchronous switching cycles of the TCSC is characterized by a sequence of time marks $t_{PCR}$, $t_{PSX}$ and $t_{SIC}$ wherein $t_{PCR}$ marks the start of primary coil current (Ipri) ramp up followed by a negative 0-crossing of Vsec, $t_{PSX}$ marks the instant of primary coil current (Ipri)-to-secondary coil current (Isec) transfer followed by a positive 0-crossing of $V_{SD}$ with Vsec ringing and $t_{SIC}$ marks the start of $FET_{sc}$ first-quadrant conduction followed by a positive 0-crossing of $I_{DS}$ also with Vsec ringing, the method comprises:
  a) sensing the forward voltage $V_{SD}$ across the body diode $BDs_{sc}$ a drain-to-source current $I_{DS}$ of the $FET_{sc}$ and the Vsec; and
  b1) upon sensing a positive 0-crossing of $V_{SD}$, turning on the $FET_{sc}$ and maintaining it in a conductive but unlatched state so it may subsequently be turned off;
  b2) upon sensing a positive 0-crossing of $I_{DS}$, turning off the $FET_{sc}$ and maintaining it in a latched state so it may not be subsequently turned on; and
  b3) upon sensing a negative Vsec, turning off the latch of $FET_{sc}$ and maintaining it in an unlatched state so it may subsequently be turned on
whereby avoid false triggering of the $FETs_{sc}$ caused by the numerous undesirable Vsec ringings, into incorrect states around the time marks $t_{PSX}$ and $t_{SIC}$ that would otherwise result in an increased secondary power loss of the TCSC.

11. The method for controlling the secondary FET of claim 10 further comprises providing a low-power bias network (LPBN) in parallel connection with the STC for generating a low power bias voltage Vcc powering the sensing of $V_{SD}$, $I_{DS}$ and Vsec as well as generating a gate drive signal $V_{GATE}$ for driving the $FET_{SC}$.

12. The method for controlling the secondary FET of claim 10 further comprises providing a low-power bias network (LPBN) in parallel connection with the Cout for generating a low power bias voltage Vcc powering the sensing of $V_{SD}$, $I_{DS}$ and Vsec as well as generating a gate drive signal $V_{GATE}$ for driving the $FET_{SC}$.

13. The method for controlling the secondary FET of claim 10 wherein sensing the drain-to-source current $I_{DS}$ comprises integrating a four-terminal current sensing Kelvin connection into the $FET_{sc}$ for producing a sampled $I_{DS}$ sense current that is a small fraction of the $I_{DS}$.

* * * * *